(12) United States Patent
Haberl et al.

(10) Patent No.: US 6,419,297 B2
(45) Date of Patent: Jul. 16, 2002

(54) UNLOCKING DEVICE FOR VEHICLE CONVERTIBLE TOPS

(75) Inventors: Franz Haberl, Wallerfing; Michael Rauscher, Deggendorf; Johann Fischer, Regen, all of (DE)

(73) Assignee: Edscha Cabrio-Verdecksysteme GmbH, Hengersberg (DE)

( * ) Notice: Subject to any disclaimer, the term of this patent is extended or adjusted under 35 U.S.C. 154(b) by 0 days.

(21) Appl. No.: 09/737,132

(22) Filed: Dec. 13, 2000

(30) Foreign Application Priority Data

Dec. 13, 1999 (DE) .......................................... 199 60 022

(51) Int. Cl.⁷ ................................................. B60J 7/185
(52) U.S. Cl. .............. 296/121; 296/107.01; 292/DIG. 5
(58) Field of Search ........................... 296/121, 107.01, 296/109.09, 224, 100.04, 100.07; 292/DIG. 5

(56) References Cited

U.S. PATENT DOCUMENTS

| | | | | |
|---|---|---|---|---|
| 5,042,869 A | * | 8/1991 | Brin ............................ | 296/121 |
| 5,284,378 A | * | 2/1994 | Sautter, Jr. .................. | 296/224 |
| 5,328,229 A | * | 7/1994 | Brandt et al. ............... | 296/121 |
| 5,678,881 A | * | 10/1997 | Tokarz ........................ | 296/121 |
| 5,839,778 A | * | 11/1998 | Schaible et al. ............. | 296/224 |
| 5,904,394 A | * | 5/1999 | Dilluvio et al. .............. | 296/121 |
| 5,944,375 A | * | 8/1999 | Schenk et al. ........... | 296/121 X |
| 5,998,948 A | | 12/1999 | Lange et al. ................. | 318/280 |
| 6,033,008 A | * | 3/2000 | Mattila ..................... | 296/121 X |
| 6,213,534 B1 | * | 4/2001 | Mac Farland ............... | 296/121 |

FOREIGN PATENT DOCUMENTS

| | | |
|---|---|---|
| DE | 19801852 | 1/1998 |
| DE | 19918628 | 4/1999 |

* cited by examiner

*Primary Examiner*—Stephen T. Gordon
*Assistant Examiner*—Jason Morrow
(74) *Attorney, Agent, or Firm*—Davidson, Davidson & Kappel, LLC

(57) ABSTRACT

The invention relates to an unlocking device for a vehicle convertible top, comprising a handle for actuating the unlocking device, and at least one locking hook which locks the vehicle convertible top and is operatively connected to the handle by means of an actuating arrangement, a signal generator being provided which detects the position of the handle and which generates a signal when the handle is shifted by a predetermined extent, and the signal causing a catch to be released, preventing further shifting of the handle beyond the predetermined extent.

17 Claims, 8 Drawing Sheets

UNLOCKING DEVICE FOR VEHICLE CONVERTIBLE TOPS

FIELD OF THE INVENTION

The present invention relates to an unlocking device for a vehicle convertible top, having a handle for actuating the unlocking device, and a locking hook which locks the vehicle convertible top and is operatively connected to the handle by means of an actuating arrangement.

DESCRIPTION OF THE PRIOR ART

Vehicle convertible tops known in practice comprise, for example, an unlocking catch in which a microswitch which detects the position of the locking element is arranged in the region of the actual locking, i.e. in the lateral region of the convertible top and in the vicinity of locking elements themselves. The blocking element, which blocks and releases the movement of the locking element, is likewise situated in the lateral region. The locking elements are actuated via a handle attached centrally.

During rapid actuation of the handle, for example by the vehicle driver, the locking element is shifted in such a manner that, although the microswitch detects the change in position of the locking element, it is possible for the blocking element to become jammed by the locking element, with the result that release of the locking element by the blocking element is no longer possible.

The multiplicity of components present between the handle and the lateral locking elements and the associated blocking element causes the respective freedom of movement of these components to add up in such a manner that the jamming may occur more frequently.

The known unlocking device therefore has the disadvantage that under unfavorable operating conditions, for example actuation of the handle too rapidly, the unlocking device jams and the convertible top cannot be immediately opened.

German laid open publication DE 198 01 852 A1 describes a locking arrangement for securing a convertible top, in which the locking arrangement can be actuated by means of a telescopically extendable closing handle, a secondary locking of the closing handle consisting in that the convertible-top locking can be actuated only when the closing handle is extended. The closing handle is secured in a purely mechanical manner without electric sensors or electromechanical catches and, although this provides a certain amount of protection against unintentional actuation of the handle, malicious opening of the convertible top, for example during travel, is not prevented.

German laid open publication DE 199 18 628 A1 relates to an actuating mechanism for a convertible roof, the front roof part being locked to the body via complicated sensors in conjunction with locking bolts which are driven by an electric motor, and the convertible-top mechanism being actuated by an electric switch.

SUMMARY OF THE INVENTION

The object of the present invention is to provide an unlocking device in which reliable unlocking of the convertible top is ensured.

The object of the invention is achieved by a signal generator being provided which detects the position of the handle and which generates a signal when the handle is shifted beyond a predetermined extent, and the signal causing a catch to be released, said catch preventing shifting of the handle beyond the predetermined extent.

The essential advantages of the unlocking device according to the invention are, firstly, that securing against unintentional opening of the convertible top is ensured and, secondly, that jamming of the unlocking device is virtually ruled out.

The abovementioned object, the features and advantages of the present invention can be better understood taking into consideration the following detailed description of the preferred embodiments of the present invention and by referring to the associated drawings.

The invention is explained in greater detail below with reference to the drawings.

DETAILED DESCRIPTION OF A PREFERRED EMBODIMENT

Figure 1:
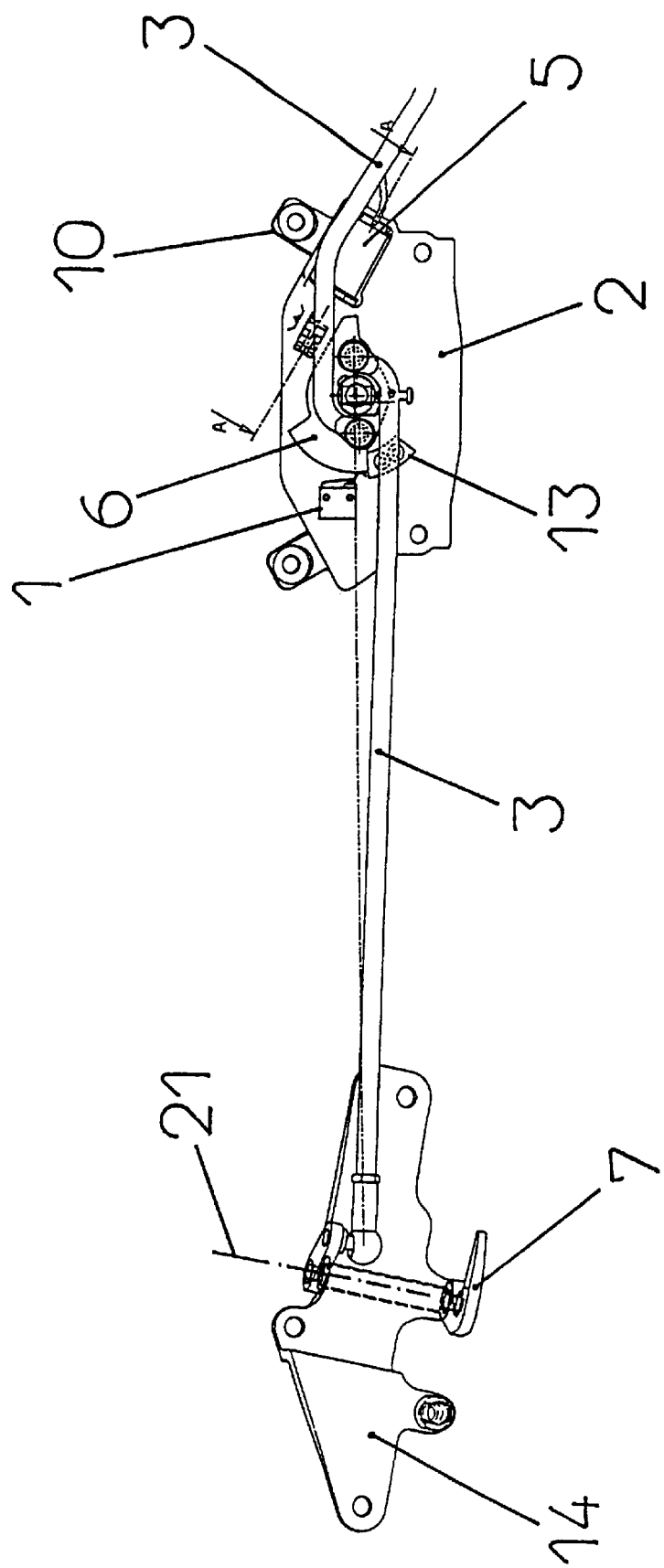
FIG. 1 shows a partially perspective view of the unlocking device according to a first preferred embodiment of the present invention.

The unlocking device which is illustrated in a first preferred embodiment in FIGS. 1 to 5 and is intended for a vehicle convertible top, such as, for example, a folding roof, a hinged roof or a hard top, comprises a support panel 2 which is arranged in the middle or centrally, as seen over the vehicle width, and on which a significant part of the unlocking device is arranged.

Actuating arrangements, which are referred to as pull rods 3 below, extend from this central support panel 2 in both transverse directions, in relation to to the vehicle, which end at a side part 14 on which a respective locking hook 7 is positioned, by means of which the convertible top can be fastened or locked to the windshield frame (not illustrated), for example. The actuating arrangement may also be a pull cable or a group of components capable of producing the operative connection between the locking hook 7 and the control unit (for example, the handle 4).

Shifting these pull rods 3 in the direction of the central support panel 2 enables the locking hook 7 to be pivoted around an axis 21 so as to effect the locking. Shifting the pull rods 3 in the direction of the side part 14 enables the locking hook 7 to be pivoted back again so as to effect the unlocking.

The pull rods 3 are shifted by a turning panel 6, which preferably consists of sheet metal, being rotated around an axis of rotation 22. It can readily be seen in FIG. 2, in an enlarged illustration, that each pull rod 3 is coupled eccentrically to the turning panel 6, so that during rotation of the turning panel 6 rotation of the coupling point 23 of each pull rod 3 around the axis of rotation 22 takes place, ultimately resulting in the pull rod 3 being shifted.

Figure 2:
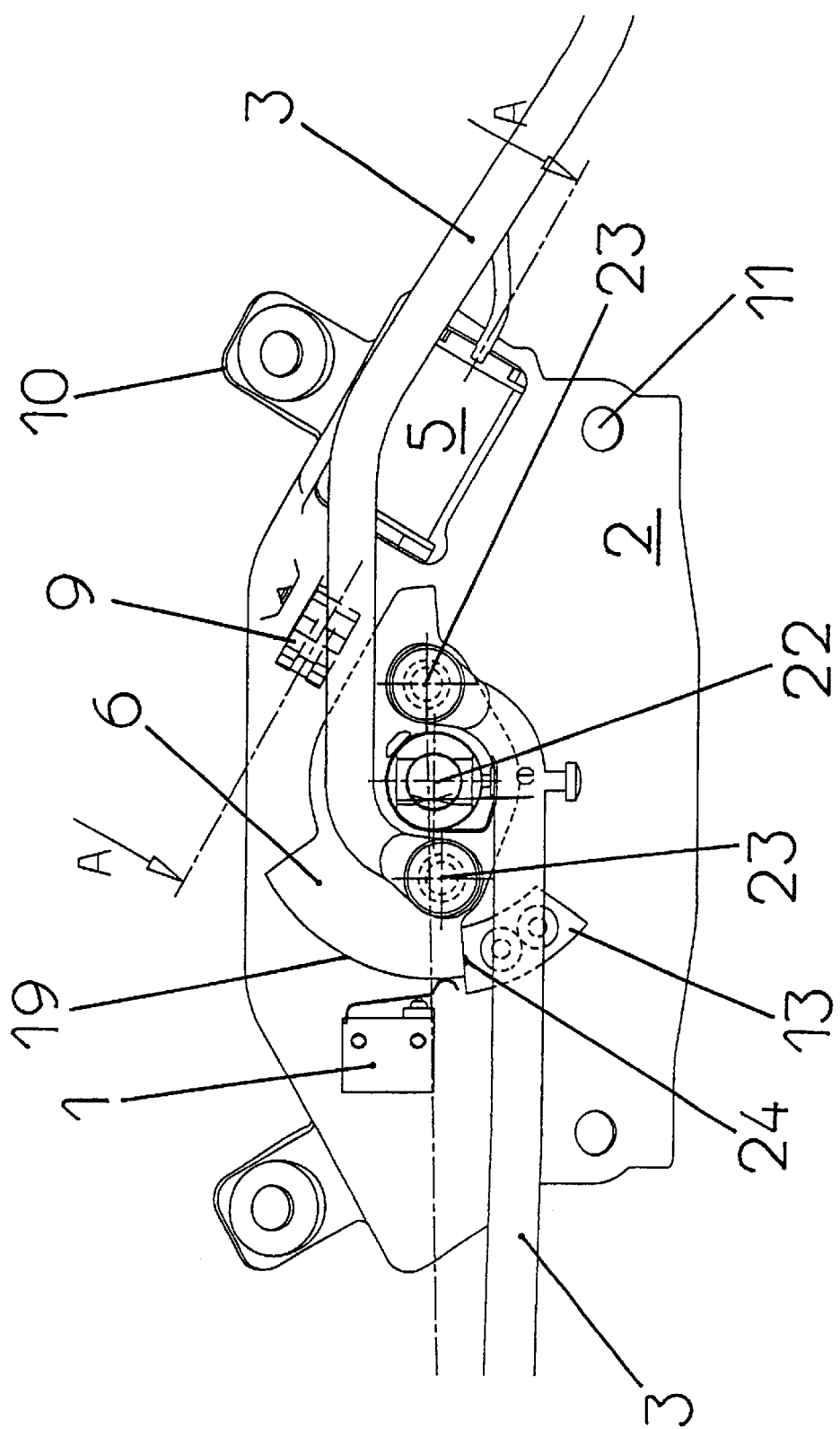
FIG. 2 shows an enlarged view of part of FIG. 1.
Figure 3:
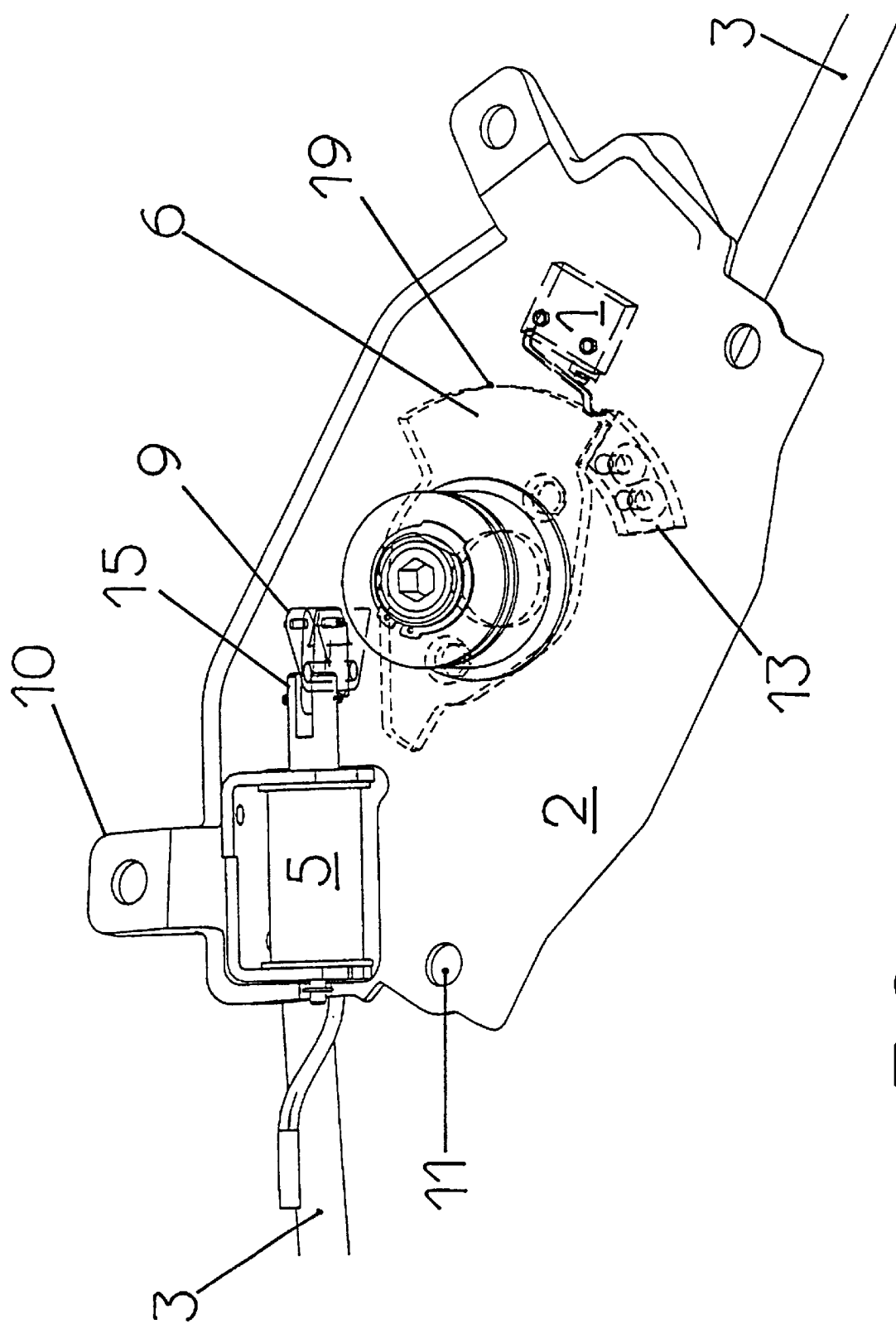
FIG. 3 shows a perspective view of a detail of a significant section of the unlocking device according to the invention, as seen from the rear side.

The position of the pull rods 3 according to FIG. 2 shows a position of the pull rods 3 beyond the dead center, since the latter have been rotated by the coupling points 23 slightly beyond the dead center. Additional securing against unintentional opening is realized in this manner. An appropriately high force has to be applied to the turning panel 6 in order to rotate the coupling points 23 or shift the pull rods 3 out of this position beyond the dead center.

The turning panel 6 has a noncircular outer contour on which variously shaped surfaces are formed. One of these surfaces is a control surface 19. Resting on the control surface 19 is a switch lever of a signal generator, which is illustrated in the figures as a microswitch 1. The signal generator may also be a sensor, a light barrier etc., the position of the turning panel 6 being detected and a corresponding signal being output by the signal generator.

In the illustration according to FIG. 2, it can be seen that below the control surface 19 a stop 13 is fastened to the support panel 2 by means of two screws. This stop 13 prevents the turning panel 6 from being able to move further counterclockwise than is illustrated in FIG. 2. The turning panel 6 may only be rotated clockwise from the position according to FIG. 2.

Clockwise rotation, from the position according to FIG. 2, causes the control surface 19 to be rotated and as soon as that edge 24 of the control surface 19 which lies at the rear (as seen in the direction of rotation) releases the switch lever of the microswitch 1, the microswitch 1 generates a signal.

Figure 5:
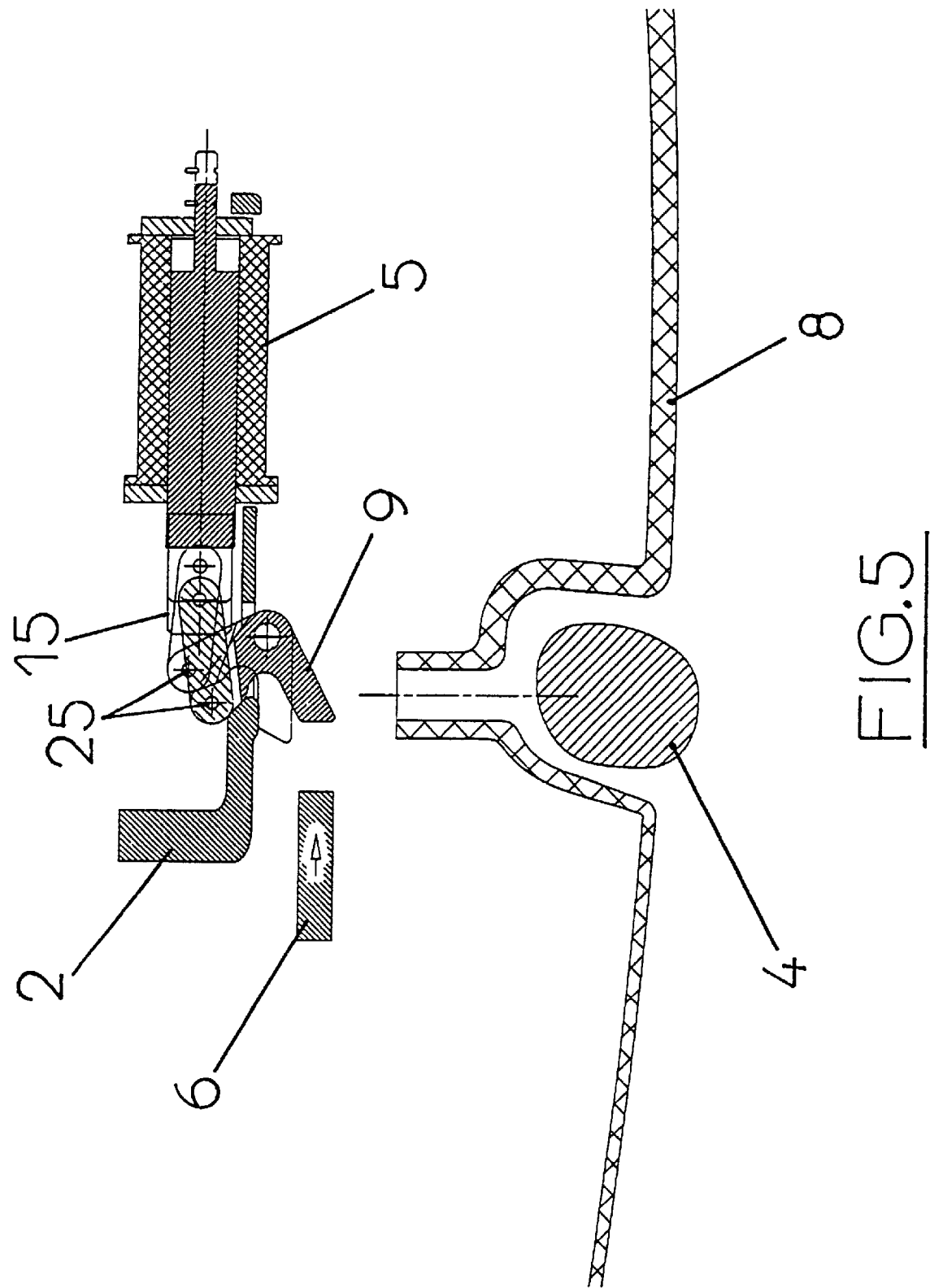
FIG. 5 shows a cross-sectional view (along the line A—A in FIG. 1 or 2) of a first design of a catch of the unlocking device of FIGS. 1 to 4.

Further rotation of the turning panel 6 in the clockwise direction is prevented by a catch, which is formed in the embodiment shown in FIG. 2 by means of a ratchet 9. This ratchet 9 is connected to a lifting magnet 5 via a coupling link 15 (FIG. 5). By activation of the lifting magnet 5, the coupling link 15 can be shifted and, via a turning joint 25, the ratchet 9 can be pivoted in such a manner that engagement with, or disengagement from, the turning panel 6 can be produced.

The support panel 2, to which the handle 4, the lifting magnet 5, the turning panel 6, the microswitch 1 and the stop 13 of the unlocking device according to the invention are directly or indirectly fastened, is itself fastened for example to a front bow or roof frame of the vehicle via fastening plates 10 and holes 11.

The support panel 2 and the associated parts of the unlocking device are covered by a cover 8.

The handle 4 is operatively connected to the turning panel 6, that is to say, when the handle 4 is rotated, the turning panel 6 is also correspondingly rotated along with it. The pull rods 3 are coupled to the turning panel 6 and are likewise shifted during rotation of the turning panel 6.

Figure 4:
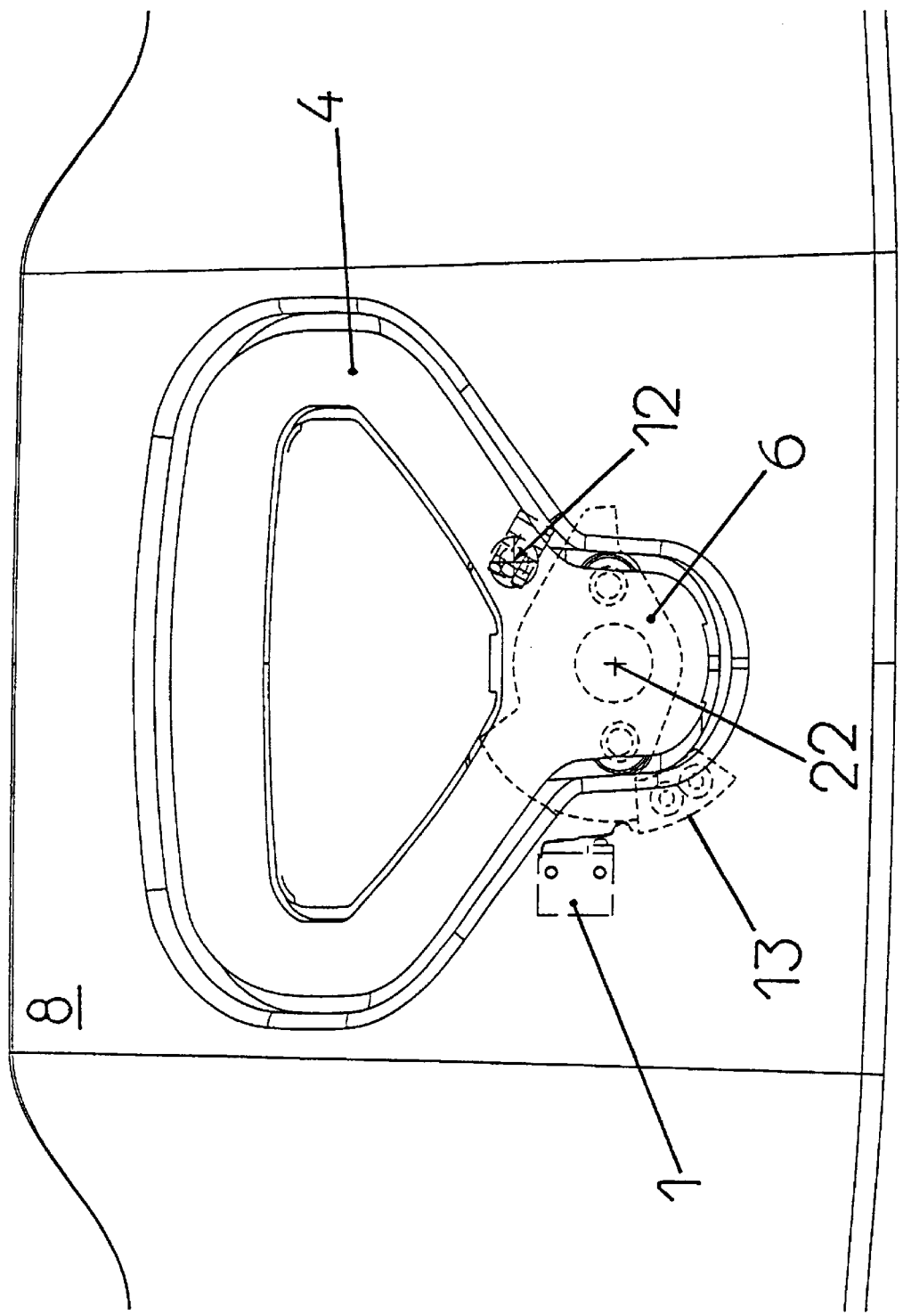
FIG. 4 shows a plan view of a handle for actuating the unlocking device of FIGS. 1 to 3.

A hinged mechanism (not shown) allows the handle 4 to be swung into the position according to FIG. 4 and swung out of this position.

FIG. 4 illustrates that the handle 4, in the swung-in position, conceals an emergency actuation hole 12 which is used for manually unlocking the ratchet 9, by inserting a pointed object into the emergency actuation hole, and therefore makes it possible to open the convertible top in an emergency.

Starting from a closed convertible top, first of all the handle 4 is pivoted out of the position according to FIG. 4. The handle 4 is swung virtually at right angles to this position according to FIG. 4.

Rotation of the handle 4 causes the turning panel 6 to be rotated along with it. As soon as the rotation of the turning panel 6 releases, by means of the control surface 19, the switch lever of the microswitch 1, a signal is generated. This signal indicates that the operator would like to open the convertible top. However, the catch has not yet been released at this point. The ratchet 9 therefore prevents further rotation of the turning panel 6.

If the vehicle is at a standstill or if the handbrake has been applied or if the parking position has been selected in the case of an automatic transmission, a further signal, a so-called safety signal, can preferably be derived from these operating states. This safety signal is preferably used in order to prevent unintentional opening of the convertible top.

Only if both signals, namely the signal from the microswitch 1 and the safety signal from, for example, the actuation of the handbrake, are present, the lifting magnet 5 is activated and the ratchet 9 released.

The turning panel 6 can then be rotated further by the handle 4 and the pull rods 3 can thereby be shifted further until the locking hooks 7 are unlocked.

The response time of the catch, i.e. the time between the start of rotation of the handle 4 and the release of the ratchet 9, can be made very short by means of this arrangement, and can be considerably shortened as compared with the prior art.

In the case of the unlocking device according to the invention, it is no longer possible for jamming, as described at the beginning in the prior art, to occur. The catch and the microswitch 1 are provided directly adjacent to the turning panel 6, with the result that no great distances lie in-between nor does a multiplicity of interposed components have to be activated.

Figure 6:
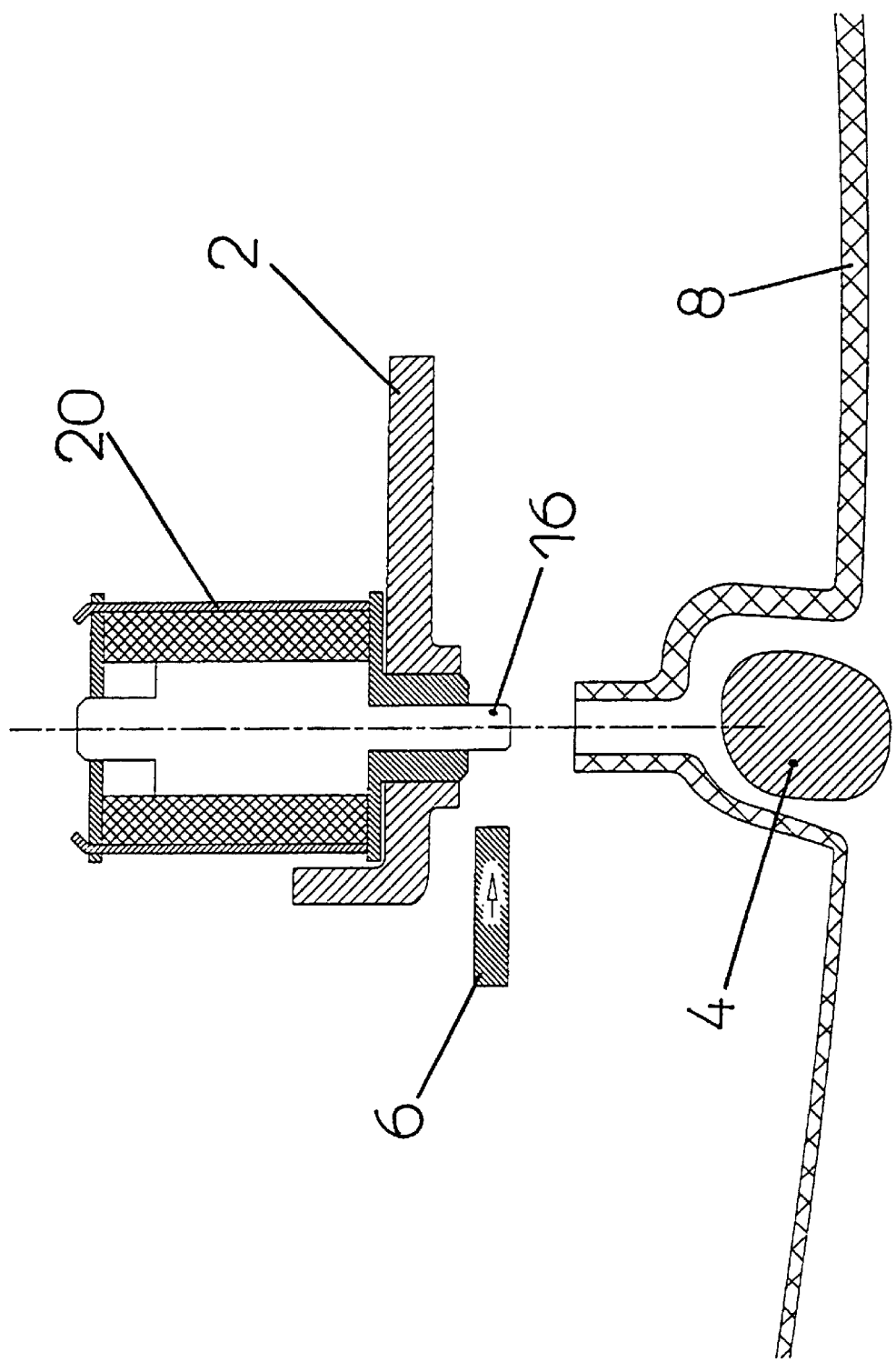
FIG. 6 shows a cross-sectional view of a further catch of the unlocking device, but according to a second preferred embodiment of the present invention.

According to a further embodiment of the present invention, which is illustrated in FIG. 6, the catch may also be designed as a direct catch 16. In this embodiment, the ratchet 9 and the coupling link 15 are omitted, while a moveable part of a solenoid 20 directly blocks or releases the turning panel 6. In the embodiment according to FIG. 6, the solenoid 20 is oriented vertically (in relation to the vehicle).

Figure 7:
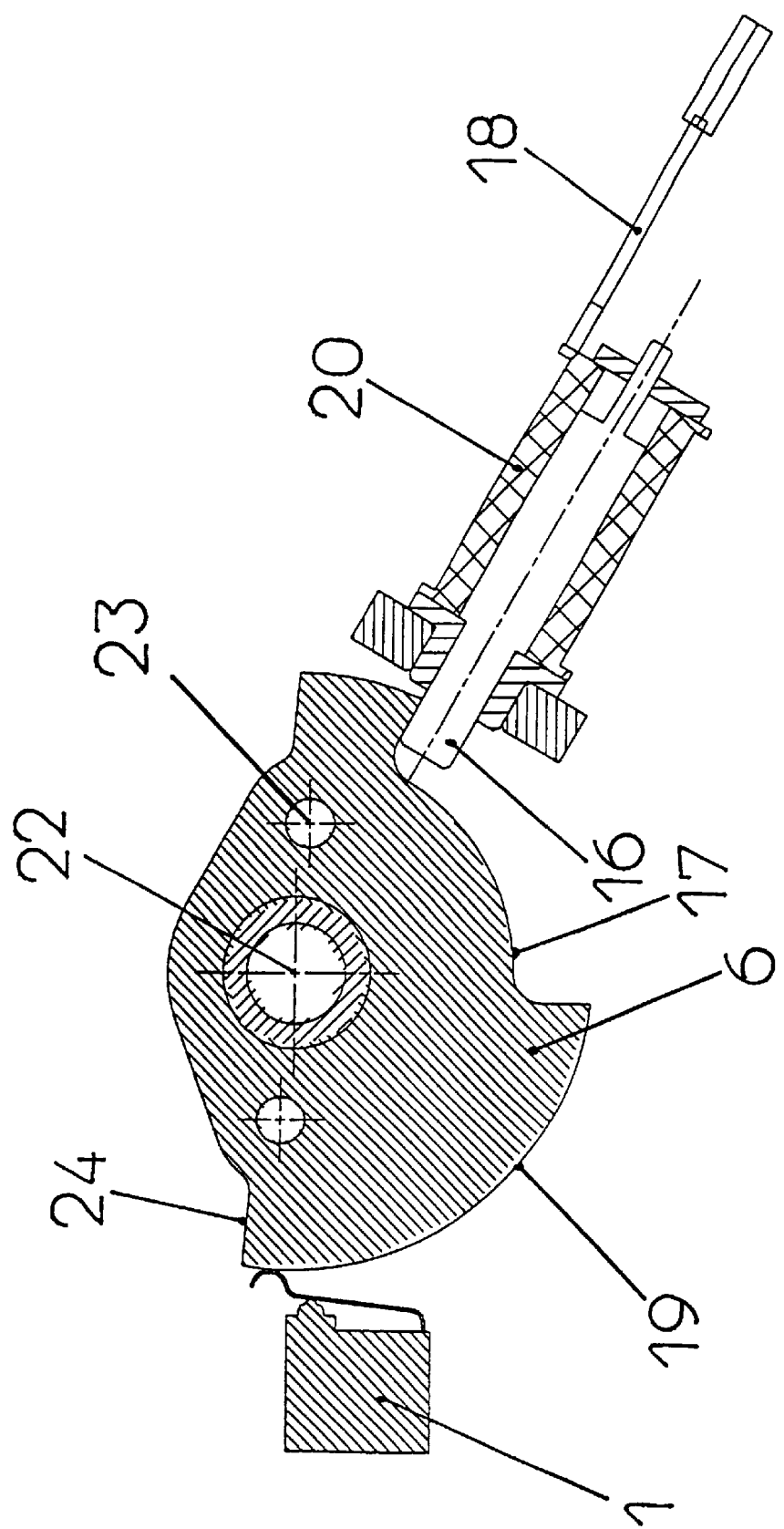
FIG. 7 shows a cross-sectional view of another catch of the unlocking device according to a third preferred embodiment of the present invention.
Figure 8:
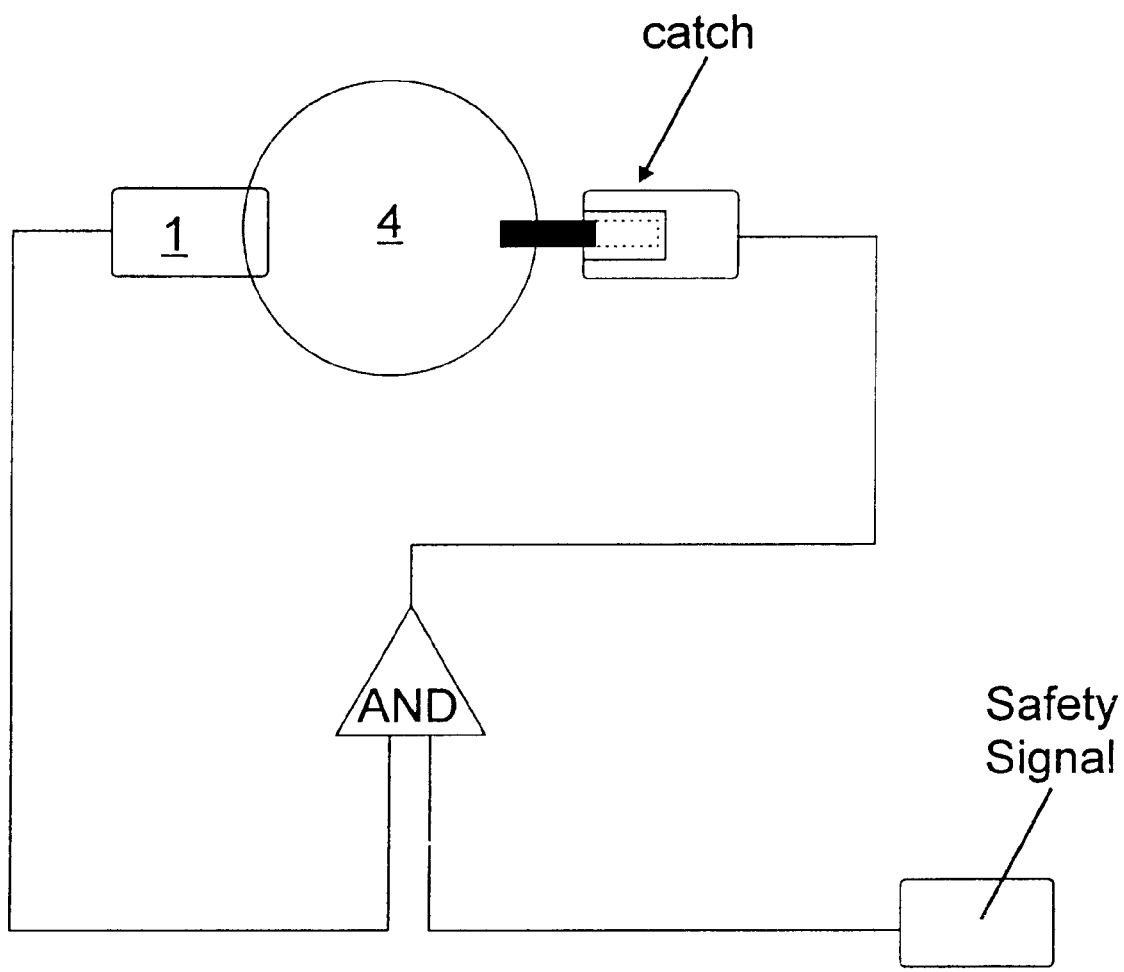
FIG. 8 shows a block diagram showing the conditions in which the top is prevented from being unlocked.

Finally, FIG. 7 shows a further embodiment, in which the solenoid 20 is arranged horizontally. The direct catch 16 is provided in a recess 17 on the turning panel 6 and allows or prevents further rotation of the turning panel 6, depending on the position of the moveable part of the solenoid 20. An electrical lead 18 leads to the solenoid 20.

In summary, an unlocking device according to the invention for a vehicle convertible top has a handle 4 for actuating the unlocking device, and also at least one locking hook 7 which locks the vehicle convertible top, the locking hook 7 being operatively connected to the handle 4 by means of a pull rod 3, a microswitch 1 being provided which detects the position of the handle 4 and which generates a signal when the handle 4 is shifted beyond a predetermined extent, and the signal causing a catch to be released, preventing the handle 4 from being shifted beyond the predetermined extent. The advantages of the unlocking device according to the invention are, firstly, that securing against unintentional opening of the convertible top is ensured and, secondly, that jamming of the unlocking device is virtually ruled out.

As regards features of the invention which are not explained specifically in greater detail above, express reference should additionally be made to the patent claims.

What is claimed is:

1. An unlocking device for a vehicle convertible top, comprising a handle for actuating the unlocking device, and at least one locking hook which locks the vehicle convertible top and is operatively connected to the handle by means of an actuating arrangement, a signal generator being provided which detects the position of the handle and which generates a signal when the handle is shifted by a predetermined extent, and a catch, the catch preventing further shifting of the handle beyond the predetermined extent, and the signal causing the catch to be released.

2. The unlocking device as claimed in claim 1, wherein the catch can only be released if at least one further safety signal is present.

3. The unlocking device as claimed in claim 2, wherein the further safety signal indicates the actuation of the handbrake.

4. The unlocking device as claimed in claim 2, wherein the further safety signal indicates the selection of the parking position of an automatic transmission.

5. The unlocking device as claimed in claim 2, wherein the further safety signal indicates a driving speed lower than a predetermined value.

6. The unlocking device as claimed in claim 1, wherein the catch is designed as a ratchet which can be electrically actuated by means of a lifting magnet.

7. The unlocking device as claimed in claim 6, wherein the ratchet is connected to the lifting magnet via a coupling link.

8. The unlocking device as claimed in claim 1, wherein the catch is designed as a direct catch which is a moveable part of a solenoid.

9. The unlocking device as claimed in claim 1, wherein a turning panel is arranged between the handle and the actuating arrangement.

10. The unlocking device as claimed in claim 9, wherein at least one actuating arrangement is coupled to the turning panel.

11. The unlocking device as claimed in claim 9, wherein the turning panel has a control surface which actuates the signal generator as a function of the shifting of the handle.

12. The unlocking device as claimed in claim 1, wherein the shifting of the handle is a rotational movement.

13. The unlocking device as claimed in claim 12, wherein the catch permits the rotational movement of the handle only up to the predetermined extent.

14. The unlocking device as claimed in claim 1, wherein the unlocking device is covered by a cover which does not cover the handle.

15. The unlocking device as claimed in claim 14, wherein the cover is provided with an emergency actuation hole through which the catch can be released manually.

16. The unlocking device as claimed in claim 15, wherein the emergency actuation hole is concealed by the handle in a swung-in position of the handle.

17. The unlocking device as claimed in claim 1, wherein the handle, the signal generator and the catch are arranged on a support panel.

* * * * *